United States Patent [19]

Edens et al.

[11] Patent Number: 5,106,633
[45] Date of Patent: Apr. 21, 1992

[54] DRY YEAST IMMOBILIZED IN WAX OR PARAFFIN FOR SCAVENGING OXYGEN

[75] Inventors: Luppo Edens, Vlaardingen; Farrokh Farin, Rijndijk; Antonius F. Ligtvoet, Delft; Johannes B. Van Der Plaat, Leiderdorp, all of Netherlands

[73] Assignee: Gist-Brocades NV, Delft, Netherlands

[21] Appl. No.: 639,363

[22] Filed: Jan. 10, 1991

Related U.S. Application Data

[63] Continuation of Ser. No. 235,584, Aug. 24, 1988, abandoned.

[30] Foreign Application Priority Data

Aug. 25, 1987 [EP] European Pat. Off. ........ 87201604.3

[51] Int. Cl.$^5$ .................. C12G 3/00; C12C 11/00; C12N 11/02; C12N 11/04
[52] U.S. Cl. ............................... 476/8; 426/12; 426/13; 426/16; 426/62; 426/407; 426/541; 435/177; 435/180; 435/182; 435/260
[58] Field of Search ............... 435/161, 177, 180, 182, 435/260, 262; 426/8, 17, 12, 13, 15, 16, 323, 398, 541, 62

[56] References Cited

U.S. PATENT DOCUMENTS

| | | | |
|---|---|---|---|
| 3,860,490 | 1/1975 | Guttag | 435/182 |
| 4,414,334 | 11/1983 | Hitzman | 435/262 |
| 4,698,224 | 10/1987 | Nakanishi et al. | 435/161 X |
| 4,719,114 | 1/1988 | Percel | 435/260 X |
| 4,774,178 | 9/1988 | Egerer et al. | 425/180 |

FOREIGN PATENT DOCUMENTS 2817854 1/1979 Fed. Rep. of Germany .......... 426/8
2143544 2/1985 United Kingdom .

OTHER PUBLICATIONS

Chemical and Engineering News, vol. 43, 1965, pp. 43-44.

*Primary Examiner*—David M. Naff
*Attorney, Agent, or Firm*—Fleit, Jacobson, Cohn, Price, Holman & Stern

[57] ABSTRACT

A food-grade oxygen scavenger for removing oxygen from foods and beverages in containers is prepared by immobilizing dried yeast containing at least 92% dry matter in a solid material such as wax or paraffin. The solid material allows for very slow penetration of water and permits the yeast to contact only water that penetrates therethrough. The immobilized yeast is coated on an inside surface of a container or on a surface of a closure such as a stopper that is on the inside of the container when closed. After adding a food or beverage and closing the container, the immobilized yeast removes oxygen from the container. The closed container and its contents can be pasteurized and the yeast retain sufficient viability to remove oxygen.

22 Claims, No Drawings

DRY YEAST IMMOBILIZED IN WAX OR PARAFFIN FOR SCAVENGING OXYGEN

This application is a continuation of application Ser. No. 07/235,584, filed on Aug. 24, 1988, now abandoned.

The present invention relates to food-grade oxygen scavengers for water containing products and to the maintenance of the quality of such water-containing products during storage. Examples of these products, which include at least some water, are beverages or oils, fats, oil and/or fat containing products.

Food or beverage deterioration and spoilage by oxygen are problems which arise during storage of many consumable products. The presence of oxygen encourages microbial activity, and various oxidation reactions. The latter category include for example, the auto-oxidation rancidity of fat containing products. In oils or oil containing products, similar processes may occur during storage which influences the quality of the product. In this way, oxygen is known to influence adversely the microbial and flavor stability of foodstuffs like cheese and meat products, juices, margarine, ketchup, beer, wine etc.

Flavor stability is a quality factor of utmost importance for beverages in general and beer in particular. Although numerous compounds have been implicated in flavor changes, the crucial role oxygen plays in all these changes is undisputed. The effects of oxygen on beer flavors have been reviewed inter alia by C. E. Dalgliesh (16th Eur. Brew. Conv. Cong. Amsterdam, 1977) and more recently by L. Narziss (J. Inst. Brew. Vol. 92, 346-353, 1986).

Beer flavor is liable to oxidative damage from the stage of wort preparation up to the stage where the beer, i.e. lager beer (pilsner type), is stored in bottles or containers. During beer fermentation, the levels of dissolved oxygen are very low as a result of metabolic activity (i.e. oxygen consumption) by the yeast. After the bright beer filtration, in which the yeasts are removed from the liquid, the beer is no longer protected and minimizing the exposure of filtered beer to oxygen becomes extremely important. However, it is very difficult to exclude completely any contact with air between the fermentation unit and the bottling machine, see e.g. C. M. Lowe and W. I. Elkin, J. Inst. Brew., 92 (1986) 517. Normally, by the time the bright beer reaches the filling machine, the liquid has picked up between 0.2 and 0.35 mg of oxygen per liter. Depending on the quality of the filling machine and the filling operation, the head space of the bottle may add another 0.2-1.0 mg of oxygen whereas during subsequent storage, another 0.5-5.0 mg of oxygen may diffuse through the cork liner into the bottle, see e.g. T. J. Wisk and K. J. Siebert, ASBC Journal, 45 (1987) 14.

To diminish damage to the beer flavor by the gradually dissolving oxygen prior to, during and after bottling, oxygen removing agents such as ascorbic acid or mannitol are sometimes added to the beer. Another possibility which has been considered is to add the enzyme glucose oxidase to the beer. However, a serious disadvantage of all these possible solutions is that "extra" and "non natural" ingredients have to be added to the beer. Therefore, it would be advantageous if the oxygen consuming activity of the yeast, which represents a "natural ingredient" and which protects the beer from oxidative damage during fermentation, could be transferred into the container in which the beverage is stored. The latter solution would eliminate not only the oxygen which dissolves in the beer prior to bottling, but also the oxygen present in the head space of the bottle and, if the yeast were to remain viable over a longer period of time, any oxygen diffusing into the bottle during storage. The end products of this yeast mediated oxygen consumption would be carbon dioxide and water, both compounds are usually present in beverages.

Although transfer of yeasts to the bottled beverages would provide a natural and very elegant solution to the problem of flavor oxidation, this solution would, if applied as such, have two major drawbacks. Firstly, introduction of even small quantities of yeasts into beverages may result in yeast growth which, ultimately, may turn originally clear beverages into unattractive turbid liquids. Secondly, most beverages are heated to temperatures above 60° C., i.e. the beverages are pasteurized, after bottling. This pasteurization is included in the bottling procedure in order to kill microorganisms like bacteria, yeasts and moulds so that microbial spoilage of the drink is prevented. Such pasteurization would also abolish all oxygen consuming activity of those yeasts which were introduced to prevent oxidative flavor damage.

The invention overcomes these problems by providing a process wherein the yeast is introduced into a container to remove the oxygen in such a way that the yeast is not allowed to propagate substantially because viable yeasts are not in direct contact with the beverage. Advantageously, the yeast is immobilised in a solid material which allows only a very slow penetration of water to the yeast. When the yeast is still in a dry immobilised condition, the container with liquid may be pasteurized without losing substantially all the activity of the yeast.

We have now surprisingly found that oxygen can be removed from pasteurized and non-pasteurized containers by using yeasts which are immobilized on and/or in e.g. by encapsulation, a suitable solid material, which is preferably situated above the liquid level of the contents of the container. As a result of the immobilization procedure, the yeasts can survive any pasteurization treatment while outgrowth in the bottled liquid is prevented because the yeasts are not liberated into the liquid. Therefore and because most (alcoholic) beverages are less suitable growth media, the yeast is not allowed to propagate substantially. Preferably less than a few doublings of the yeast in the immobilizing material takes place.

The material used for immobilization of the yeast should not only be acceptable for use in direct contact with beverages or food-products intended for human consumption, i.e. the material should be "food-grade", but the material should have, amongst other attributes, acceptable properties with respect to permeability for oxygen, carbon dioxide and water. Furthermore, an elevated temperature treatment e.g. as applied during pasteurization of the container plus its contents, should not affect the physical properties of the material to the extent that the permeability or its solid character is changed. Suitable materials for the process of yeast immobilization are, for example, specific types of waxes and polymers such as paraffin or mixtures thereof, optionally blended with improvers. By improver is meant an agent for improving the attachment of the immobilizing material to the carrier surface. Suitable waxes and polymers have a melting range of between 70° and 140° C. Preferably this melting range is between 80° and 100°

C. These materials may advantageously be used as a thin layer or film containing the yeasts in contact with the beverage or, preferably, this film is situated above the liquid and is in contact only with the gases and vapours above the liquid.

The wax should have a limited permeability to water vapour and preferably a high transmission rate for gases like oxygen and carbon dioxide. Preferably the permeability to water vapour should be less than 100 units $PH_2O$ whereas the transmission rate for oxygen should be greater than 0.01 units Pox. More preferably the permeability to water vapour is less than 10 units $PH_2O$ and the permeability to oxygen greater than 0.1 units Pox. The permeability unit P used is defined as the "barrier", the standard unit of P adopted by ASTM. More precisely the permeability of $PH_2O$ is defined as $$\frac{(cm^3 \text{ at STP})(mm \text{ thickness}) \times 10^8}{(cm^2 \text{ area})(s)(cm \text{ Hg})}$$

and the permeability unit Pox as $$\frac{(cm^3 \text{ at STP})(mm \text{ thickness}) \times 10^{10}}{(cm^2 \text{ area})(s)(cm \text{ Hg})}$$

at 25° C. and are described in "Polymer Permeability" by J. Comijn (Elsevier Applied Science Publishers; 1985) pages 61-63.

Most yeasts are known to withstand temperatures well above 65° C. for a limited period of time as long as they contain only a few percent of water. However, in a wetted state, they cannot withstand temperatures higher than 55°-60° C. for more than a few minutes without losing all their metabolic capacity. Therefore, to survive a pasteurization procedure, the yeast has to be substantially dry whereas after the pasteurization treatment, wetting of the yeast is essential to make it active and to initiate oxygen consumption. So, more particularly, the present invention provides a process which comprises the immobilization of dry yeasts in a food-grade solid material which material allows only a very slow penetration of water. As a result most of the yeast will remain essentially dry during pasteurization of the container but will become wet and hence active during prolonged exposure to a water-saturated atmosphere as exists in the head space of a closed container of the water-containing product.

In a preferred embodiment of the invention dried yeasts (preferably more than 92 wt % dry matter, more preferably 94-96 wt %) are mixed with the molten immobilising material to form a slurry after which the mixture is fixed on the inside of the cork or stopper with which the container is to be closed. Preferably the mixture of dried yeast and molten immobilizing material is applied within a short time, for example is applied to the cork within one minute. A short time is preferred in order to prevent substantial killing of the yeast cells. For example, nowadays bottles frequently are closed using crown corks provided with a polymer coating (e.g. polyvinylchloride=PVC or polyethylene=PE) on the inside, see e.g. Chemical and Engineering News, Feb. 8, 1965, pp. 43-44, UK patent application GB 1,211,780 and Japanese patent applications J48032086 and J50112181. Advantageously a PE coating is used. The mixture of yeasts and embedding material may be dosed or applied to this coating so that a layer having a thickness of between 5-500 microns, advantageously between 10-200 microns, may be attached to the inside of the crown cork. Such layers should contain between 0.01-40 milligrams, advantageously between 1-10 milligrams, of dry yeast per square centimeter of coating. Containers provided with the protected yeast are preferably stored in such a way that the liquid does not come into contact with the immobilized yeast, for example, bottles having the yeast coated on the inside of the cork are kept upright, during pasteurization as well as during storage by the manufacturer and before selling to the consumer although incidental contact with the liquid during transport is not harmful.

It will be appreciated by a person skilled in the art that an immobilising material has to be used which adheres satisfactorily to the surface in question. A suitable immobilising material for a polymer inner coating is, for example, a polymer blended microcrystalline wax.

It will be appreciated that the immobilised yeast is preferably not present to any significant extent on the sealing area itself, for example, in case of a bottle with a polymer coated crown cork, the yeast should not be present between the lip of the bottle and the cork liner.

During filling and pasteurization some beverages may foam so that the layer of immobilising material and yeast become thoroughly wet prior to completion of pasteurization. Therefore, the immobilising material has to resist for a short interval direct contact with liquid so that the immobilised yeast remains well protected during the subsequent heat treatment. Although part of the yeast may be killed during pasteurization, it has been found that this affects only the outer layers, i.e. the side which is not fixed to the polymer coating. In order to minimize the number of yeast cells killed, the layer of yeast and immobilising material may itself be coated, optionally by the same material as the immobilising material, preferably to give a protective layer 0.1-50 microns in thickness. By using such a protective layer, the requirements for the immobilising material may be different, e.g. the requirement for resistance to moisture penetration may be reduced.

Normally in the time between pasteurization and consumption of the liquid, the yeast will have removed any oxygen from the container. Even when the container is cooled, for example by the consumer, the yeast will still be sufficiently active to prevent an increase in oxygen level in the container.

The yeast to be used according to the present invention is for example any yeast belonging to the genus Saccharomyces, Kluyveromyces or Schizosaccharomyces.

The following Examples are given to illustrate the invention.

EXAMPLE 1

A slurry of molten paraffin (Micro 170, Levita Chem) and dry yeast (*Saccharomyces cerevisiae*, 96 wt. % dry matter) containing 70 mg of yeast per ml of paraffin was prepared by mixing the two components at a temperature of 95° C. One ml of the hot slurry was used to cover a thoroughly cleaned glass slide with a layer of 0.1 mm thickness containing approximately 7 mg of yeast per $cm^2$. After solidification of the layer, the slides were heated for 10 minutes at 65° C. in a water-saturated atmosphere, contained in a 350 ml bottle. The slides were then allowed to cool down after which the slides, having a wax-covered surface of 10 $cm^2$, were submerged in 300 ml of air-saturated water. The bottles were closed with grease-coated stoppers and incubated at 30° C. for 14 days. Bottles containing identical quantities of air-saturated water but without slides were used as blanks in this experiment. After incubation, the oxygen content of every bottle was determined after opening using a Solomat 2008 oxygen Modumeter equipped with a Clarck oxygen electrode. Equilibrium was usually obtained within one minute. The results obtained are shown in the Table 1.

TABLE 1

| Bottle no. | Slide present | Residual oxygen concentration after 14 days |
|---|---|---|
| 1 | no | 7.50 ppm |
| 2 | no | 7.40 ppm |
| 3 | no | 7.30 ppm |
| 4 | no | 7.53 ppm |
| 5 | no | 7.13 ppm |
| 6–14 | yes | 0.00 ppm (8 experiments) |

EXAMPLE 2

Paraffin of the type used in Example 1 was melted, mixed with different quantities of dry yeast (*Saccharomyces cerevisiae*, 92 wt. % dry matter), poured in moulds with a total volume of 20 cm³ after which the slurry was allowed to solidify. Quantities of paraffin and yeast were calculated in such a way that two different blocks containing either 2 or 5 g of yeast per 20 cm³ were obtained. From the block containing 2 g of yeast, slices of 0.25 mm thick were cut, while from the block containing 5 g of yeast, slices of 0.10 mm thick were cut. As all sections were 2×2 cm, each individual slice contained 10 mg of yeast. These slices were then fixed to a glass stopper (using silicon grease) so that after closure of a bottle, the effect of crown corks with different layers of immobilized yeast was simulated. To test the system, bottles with a total volume of 355 ml were filled with 300 ml of artificial beer. The composition of the artificial beer, per litre was as follows: 52 ml of ethanol (96%); 30.0 g of dextrins; 150 mg of glycerol; 480 mg of KCl; 700 mg of NaH$_2$PO$_4$; 140 mg of CaCl$_2$; 250 mg of MgSO$_4$ and 3.0 g of bovine serum albumin (which was added as the final ingredient). Water was added to make one litre and the pH value was adjusted to 4.0 using HCl. Artificial beer is used to avoid competitive oxygen consumption by beer components.

Prior to closing the bottles with the glass stoppers prepared as described above, the head space of 55 ml air above the liquid was flushed with carbon dioxide gas for 1 minute after which the stopper was placed immediately.

Pasteurization of the bottles containing the artificial beer and holding different layers of immobilized yeasts was simulated by immersing the bottles in a waterbath at 65° C. The content of the bottls was maintained at a temperature of 65° C. for a period of 20 minutes (exact temperature of contents was measured in a separate control bottle) after which the bottles were placed in an incubator at a temperature of 30° C. After 7 days incubation, the amount of oxygen dissolved in the artificial beer in each bottle was measured by the method described in Example 1. The results, showing the effect of viable yeast cells on the oxygen concentration in the bottles, are shown in the Table 2. In one experiment, a yeast with 96% wt. % dry matter instead of the yeast with 92 wt. % dry matter was used for mixing with the paraffin. The yeast with 96 wt. % dry matter has a lower moisture content which is probably the reason why this yeast has a better capacity to withstand high temperatures. As can be seen from the data shown in Table 2, this improved temperature stability is not only reflected in a higher number of cells surviving the pasteurization treatment, but also in a much lower concentration of residual oxygen in the bottle.

TABLE 2

| Slice thickness | Dry matter content of yeast (wt %) | Number of viable cells (arbitrary units) | Residual oxygen concentration after 7 days |
|---|---|---|---|
| 0 (blank) | — | — | 1.78 ppm (3 experiments) |
| 0.10 mm | 92 | 50 | 1.41 ppm (3 experiments) |
| 0.25 mm | 92 | 100 | 1.42 ppm (3 experiments) |
| 0.25 mm | 96 | 10.000 | 0.60 ppm (3 experiments) |

It will be appreciated that a longer period of time will result in a lower residual oxygen concentration.

EXAMPLE 3

Wax, Dicera 8582, obtained from Paramelt-Syntac B. V. (Heerhugowaard, Holland) was pulverized and mixed intensively with powdered dry yeast (*Saccharomyces cerevisiae*, 96 wt. % dry matter) in a weight ratio of 20 g of wax to 3 g of yeast. Amounts of 40 or 80 mg of this mixture were applied to the centre of crown corks provided with polyethylene liners. The mixture was fused to the crown cork linear by local heating, not exceeding 95° C., thereby creating a flat wax-yeast layer.

Beer bottles were filled with 350 ml of artificial beer of a composition similar to the one described in Example 2, which had previously been de-oxygenized by flushing with nitrogen gas. Subsequently crown corks were fixed as fast as possible to the bottles with the aid of a capping device commonly in use in the beer industry. It is estimated that this corking procedure increased the initial oxygen content from 0.5 ppm to 1.5 ppm on the average.

The bottles were pasteurized during 20 minutes at a temperature of 65° C. in a way similar to the procedure described in Example 2. After cooling down, however, the bottles were placed in a incubator at a temperature of 20° C., simulating storage at room temperature.

Control series contained either plain crown corks or crown corks provided with 60 mg of pure wax only, fixed to the liner's centre. Determination of the oxygen content of the artificial beer in course of time, after opening was performed with a Solomat 2008 oxygen Modumeter equipped with a Clarck oxygen electrode. The results, presented as the mean residual oxygen concentrations obtained from five bottles, are shown in Table 3.

TABLE 3

| Application to the crown cork | Residual oxygen (ppm) after 2 days | 21 days |
|---|---|---|
| None (control) | 1.8 | 2.3 |
| 60 mg of wax only | | 2.0 |
| 40 mg of yeast-wax | | 1.2 |
| 80 mg of yeast-wax | | 0.58 |

EXAMPLE 4

The necks of two ordinary 30 cl beer bottles were cut off and fumed together, their joint length being approximately 14 cm. One opening was provided with a silicon rubber stopper and sealed with a crown cork to ensure a minor contribution of inward diffusing oxygen through this route. Artificial beer, as described in Example 2, but with omission of bovine serum albumin to prevent foaming, was de-oxygenated by 24 hour incubation in an anaerobic tent employing a gas phase composed of nitrogen 90%, hydrogen 7% and carbon dioxide 3%. This beer was transfered to double-neck bottles leaving a head space of 45 ml. After rinsing with carbon dioxide gas these bottles were capped with a crown cork fitted with a 0.25 mm paraffin layer containing 10 mg of immobilized active dry yeast with a surface area of 2 cm$^2$, prepared as described in Example 2. Control double-neck bottles were sealed with standard crown corks.

All bottles were subsequently pasteurized as described in Example 2. After cooling the bottles were placed in a vacuum dessicator and after high vacuum suction $^{18}O_2$ (95 atom %, Amersham Int.) diluted with pure nitrogen gas to a final concentration of 15% of $^{18}O_2$, was admitted and the whole was kept at room temperature (20° C.).

After 4 and 12 weeks the crown corks covering the silicon rubber stoppers were removed and a needle was pierced through this stopper to take a sample of the bottle's vapour phase with its attached gas tight lock hypodermic syringe. The contents were transferred to a combined GC-mass spectrometer to analyze the quantity of $^{18}O_2$. The figures obtained are the average of observed $^{18}O_2$ values from 12 bottles per series. After 4 weeks the bottles containing paraffin-yeast contained 78% less $^{18}O_2$ than control bottles equipped with standard crown corks. After 12 weeks this difference had decreased to 35%.

The results demonstrate that yeast immobilized in the manner described is not only capable of removing the initial oxygen from a bottle filled with a beverage but will also remove the inwards diffusing oxygen for a prolonged period of time. The results show that shelf life of beer can be prolonged with two months at least.

We claim:

1. A dried yeast having more than 92% dry matter and immobilized in a solid material selected from the group consisting of wax, paraffin and a mixture thereof which allows a very slow penetration of water therethrough so that the yeast can contact only water that penetrates through the solid material.

2. A dried yeast according to claim 1 wherein the solid material allows a fast penetration of oxygen therethrough.

3. A dried yeast according to claim 1 wherein the material is acceptable for use in direct contact with beverages or food products for human consumption.

4. A dried yeast according to claim 1 wherein part of the yeast is compable of surviving treatment at elevated temperature.

5. The dry yeast of claim 1, wherein the solid material has a permeability to water vapor of less than 100 units $P_{H2O}$ and a transmission rate for oxygen of greater than 0.01 units $P_{OX}$.

6. The dry yeast of claim 5, wherein the solid material has a permeability to water vapor of less than 10 units $P_{H2O}$ and a transmission rate for oxygen of greater than 0.1 units $P_{OX}$.

7. A film comprising a dried yeast having more than 92% dry matter and immobilized in a solid material selected from the group consisting of wax, paraffin and a mixture thereof which allows a very slow penetration of water therethrough so that the yeast can contact only water that penetrates through the solid material.

8. A film according to claim 7 having an average thickness of 5-500 microns.

9. A film according to claim 7 coated with a protective layer.

10. A film according to claim 7, wherein the film has an average thickness of from 10-200 microns.

11. A film according to claim 9, wherein the protective layer has a thickness of 0.1-50 microns.

12. A closure for a container comprising on at least a part of a surface a film having a dried yeast having more than 92% dry matter and immobilized in a solid material selected from the group consisting of wax, paraffin and a mixture thereof which allows a very slow penetration of water therethrough so that the yeast can contact only water that penetrates through the solid material.

13. A closure according to claim 12 which is a crown cork having the film on a surface that will be on the inside of a closed container.

14. A process for producing an immobilized dry yeast having more than 92% dry matter and which comprises immobilizing a dry yeast in a solid material selected from the group consisting of wax, paraffin and a mixture thereof which allows a very slow penetration of water therethrough so that the yeast can contact only water that penetrates through the solid material.

15. A process according to claim 14 wherein the solid material allows a fast penetration of oxygen therethought.

16. A process according to claim 14 wherein the solid material is cast as a film onto the yeast.

17. A process according to claim 16 wherein the film is fixed to a surface of a crown cork that will be on the inside of a closed container.

18. A process for removing oxygen from closed containers containing a water-containing product, comprising the steps of:
  (a) immobilizing a dried yeast having more than 92% dry matter in a solid material selected from the group consisting of wax, paraffin and a mixture thereof which allows a very slow penetration of water therethrough so that the yeast can contact only water that penetrates through the solid material;
  (b) coating at least a part of a container inside surface with the immobilized yeast;
  (c) adding a water-containing product to the container and closing the container; and
  (d) removing oxygen from the closed container by action of the immobilized yeast.

19. A process according to claim 18 wherein the closed container is subjected to a pasteurization treatment when the yeast is still in substantially dry condition.

20. A process according to claim 18 wherein the solid material is cast as a film onto the yeast.

21. A process according to claim 18 wherein the yeast is in a film coated on at least a part of a closure surface that is on the inside of the closed container.

22. The process of claim 19, wherein the water-containing product is beer.

* * * * *